United States Patent [19]

van Zyl et al.

[11] Patent Number: 5,492,871
[45] Date of Patent: Feb. 20, 1996

[54] SUPERSTOICHIOMETRIC MGAL$_2$O$_4$ SPINEL AND USE THEREOF, AND PROCESS FOR THE SYNTHESIS THEREOF

[75] Inventors: Arnold van Zyl; Ping Wang, both of Ulm, Germany

[73] Assignee: Daimler-Benz AG, Germany

[21] Appl. No.: 199,769

[22] Filed: Feb. 22, 1994

[30] Foreign Application Priority Data

Feb. 19, 1993 [DE] Germany .......................... 43 05 170.7

[51] Int. Cl.$^6$ ................................................. C04B 35/443
[52] U.S. Cl. ........................................ 501/120; 423/600
[58] Field of Search ............................. 501/120; 423/600

[56] References Cited

U.S. PATENT DOCUMENTS

| | | | |
|---|---|---|---|
| 3,577,247 | 5/1971 | McKenna | 501/120 |
| 3,950,504 | 4/1976 | Belding et al. | 423/600 |
| 4,273,587 | 6/1981 | Oda et al. | |
| 4,542,112 | 9/1985 | Matsui et al. | |
| 5,001,093 | 3/1991 | Roy et al. | 501/120 |

FOREIGN PATENT DOCUMENTS

| | | |
|---|---|---|
| 2541141 | 4/1976 | Germany . |
| 1296049 | 11/1972 | United Kingdom . |

OTHER PUBLICATIONS

Chemical Abstracts 113(24): 215347f (1990).
Chemical Abstracts 113(4): 28056y & J Am Ceram Soc 73(5) 1153–8 (1990).
Chemical Abstracts 110(20): 178252m & J Am Ceram Soc 72(2) 271–7 (1989).
Chemical Abstracts 115(24): 268204e & J Phys Chem Solids 52(9) 1055–9 (1991).
Chemical Abstracts 116(26): 261516v & Jnd Eng Chem Res 31(5) 1252–8 (1992).
Chemical Abstracts 115(4): 34764k & Ind Eng Chem Res 30(7) 1444–8 (1991).

*Primary Examiner*—Karl Group
*Attorney, Agent, or Firm*—Arnold, White & Durkee

[57] ABSTRACT

A superstoichiometric MgAl$_2$O$_4$ spinel, which can be used, for example, as material for a high temperature crucible, is synthesized by, producing a precursor mixture comprising intimately mixed oxides of the corresponding metals in the spinel. Magnesium is added in a superstoichiometric amount to the precursor mixture. Prior to spinel formation, from one to five percent by weight of a reactive salt containing fluorine and/or boron, based on the metal oxides of the spinel, are added to the precursor mixture, and the doped precursor mixture is mixed for from 0.5 to 3 hours. Finally, the mixed precursor mixture is heated for between 0.5 and 4 hours at a temperature between 1150° C. and 1400° C. to synthesize the Mg$_{(1+x)}$Al$_2$O$_4$ spinel which is superstoichiometric with respect to magnesium.

4 Claims, 4 Drawing Sheets

SUPERSTOICHIOMETRIC MGAL$_2$O$_4$ SPINEL AND USE THEREOF, AND PROCESS FOR THE SYNTHESIS THEREOF

BACKGROUND AND SUMMARY OF THE INVENTION

The present invention relates to a MgAl$_2$O$_4$ spinel, and a process for the synthesis thereof, and a method of using the MgAl$_2$O$_4$ spinel.

British Patent No. 1,296,049 discloses a process for synthesizing a stoichiometric magnesium/aluminum spinel. The synthesis of the spinel starts from a starting mixture which contains magnesium compounds and aluminum compounds. This starting mixture is calcined with oxygen to form magnesium and aluminum oxides. In the precursor mixture of the oxides which forms, the ratio of the magnesium used to the aluminum used is between 1.001:2 and 1.217:2, i.e. is superstoichiometric. From this precursor mixture composed of, inter alia, the oxides, the Mg/Al spinel of stoichiometric composition is synthesized by heating the precursor mixture, with periclase (MgO) also being formed in addition to the spinel, as a result of the excess of magnesium oxide.

For the formation of periclase, see DE-A 2,541,141, p. 15, Example 3. The spinel form is milled, pressed into a solid body of a desired shape and sintered. The sintered solid body is then used, for example, as a crucible for producing β"-aluminate solid electrolytes of sodium/sulphur batteries. In addition to the unwanted periclase, which causes interference, a further disadvantage of this known process is that the Mg/Al spinel synthesized thereby is sensitive to sodium oxide vapors which are formed, for example, in the production of these solid electrolytes for sodium/sulphur batteries.

U.S. Pat. No. 4,273,587 discloses a process for preparing an Mg/Al spinel, although this spinel has a substoichiometric proportion of magnesium. To prepare this spinel, an MgO/Al$_2$O$_3$ starting mixture is heated to from 1150° C. to 1300° C., with the MgO being present in a substoichiometric amount. The spinel thus obtained from this starting mixture by calcination is milled and sintered to give a solid body of the desired shape. To obtain a high mutual mobility of the powder particles and to ensure good sintering of the grain boundaries of the spinel powder, between 0.001 and 0.1% by weight of LiF is added in the sintering of the pulverulent spinel. The stability of this spinel material to heated alkali metal oxides, particularly to sodium oxide, is low, as is also the case for the above-mentioned MgAl$_2$O$_4$ spinel of stoichiometric composition.

U.S. Pat. No. 4,542,112 likewise discloses a process for preparing an Mg/Al spinel having a substoichiometric proportion of magnesium, with the starting materials used in this process being alkoxides containing Mg and Al. The ratio of the alkoxides in the starting mixture, to which LiF is added prior to hydrolysis to MgO and Al$_2$O$_3$, has an excess of aluminum. This ratio, which is substoichiometric with respect to magnesium, is necessary to avoid periclase, since otherwise. That is, with a superstoichiometric proportion of magnesium oxide, an interfering periclase (MgO) phase is formed in addition to the desired spinel phase in the subsequent spinel preparation.

It is, therefore, an object of the present invention to provide an MgAl$_2$O$_4$ spinel which is as free as possible of periclase and which is stable to hot alkali metal oxide vapors. In addition, it is an object of the present invention to provide an improved process for preparing such a MgAl$_2$O$_4$ spinel, and a novel use of the spinel.

These objects have been achieved according to the present invention by providing a spinel having a superstoichiometric proportion of magnesium and by a process in which from one to five percent by weight of a reactive salt containing fluorine and boron, based on the metal oxides of the Mg$_{(1+x)}$Al$_2$O$_4$ spinel, are added to the precursor mixture before formation of spinel, mixing the precursor mixture for from 0.5 to 3 hour and, for the synthesis of the Mg$_{(1+x)}$Al$_2$O$_4$ spinel which is superstoichiometric with respect to magnesium, heating the mixed precursor mixture between 0.5 and 4 hours at a temperature between 1150° and 1400° C. As a result of the early addition of an additive, particularly a reactive salt such as LiF or NaF, to the aluminum oxide-containing starting components having a mainly face-centered cubic crystal lattice, on heating, positively charged atoms of the additive (e.g., Na$^+$ or Li$^+$) occupy some sites of the hydrogen atom (H$^+$) leaving the crystal structure. The occupation of some hydrogen lattice sites by the cations stabilizes the highly symmetrical face-centered cubic host crystal lattice of the heat-treated powder formed from the aluminum oxide-containing starting materials, even at temperatures above 1200° C. A temperature of 1200° C. is of interest because, on the one hand, the host crystal lattice is usually destroyed above this temperature by the driving-off of the hydrogen and, on the other hand, it is only above about this temperature that significant Mg/Al spinel synthesis occurs.

On addition of boron ions (B$^+$), the boron replaces the aluminum (Al$^{3+}$), producing a charge asymmetry or a vacancy in the lattice, which facilitates the incorporation of the divalent magnesium ion (Mg$^{2+}$). However, the maintenance of a host crystal lattice similar to the face-centered cubic Mg/Al spinel is of importance for the superstoichiometric incorporation of the magnesium during the preparation of the spinel, since this incorporation is made easier or made possible in the first place if the starting materials have a host crystal lattice (e.g., face-centered and cubic) which is largely similar to that of the Mg/Al spinel to be prepared (body-centered and cubic, or hexagonal). In addition, the maintenance of the host crystal lattice, despite the superstoichiometric proportion of magnesium oxide in the precursor mixture and thus contrary to conventional thinking, also surprisingly suppresses the formation of the periclase phase in the Mg/Al synthesis.

Increasing the temperature-stability of the host crystal lattice is furthermore also favorable since, as can be seen from a phase diagram of an Mg/Al spinel, this spinel is formed only above 1150° C. In addition to the partial substitution of the hydrogen lattice sites by the cations, there is also a partial substitution of the lattice sites of oxygen by the anions, for example by the univalent fluoride. This creates vacancies which make the incorporation of the magnesium easier. The incorporation and the raising of the superstoichiometric proportion of the magnesium in the spinel is thus a direct consequence of the timely addition of the fluorine- or boron-containing additive which serves to stabilize the host crystal structure and to raise the concentration of the oxygen vacancies in the heat-treated starting materials.

The high proportion of magnesium is of particular interest in spinels which are used for crucibles for producing β"-alumina ceramic electrolytes sodium/sulphur high-temperature batteries, since the heated sodium oxide usually attacks the spinel of the crucible. Here the superstoichiometric proportion of magnesium according to the invention has the effect of the magnesium of the spinel protecting against alkali metal oxides, in particular the heated sodium oxide. Furthermore, the spinel and any articles which may be sintered therefrom is convenient to produce.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

The flow diagrams shown in FIG. 1, FIG. 2, FIG. 3, and FIG. 4 are divided into three columns from left to right. The starting materials are entered in the first or left-most column, in the second or middle column are the process steps and the product formed in each case, and in the third or right-most column are the process conditions for each process step.

Figure 1:
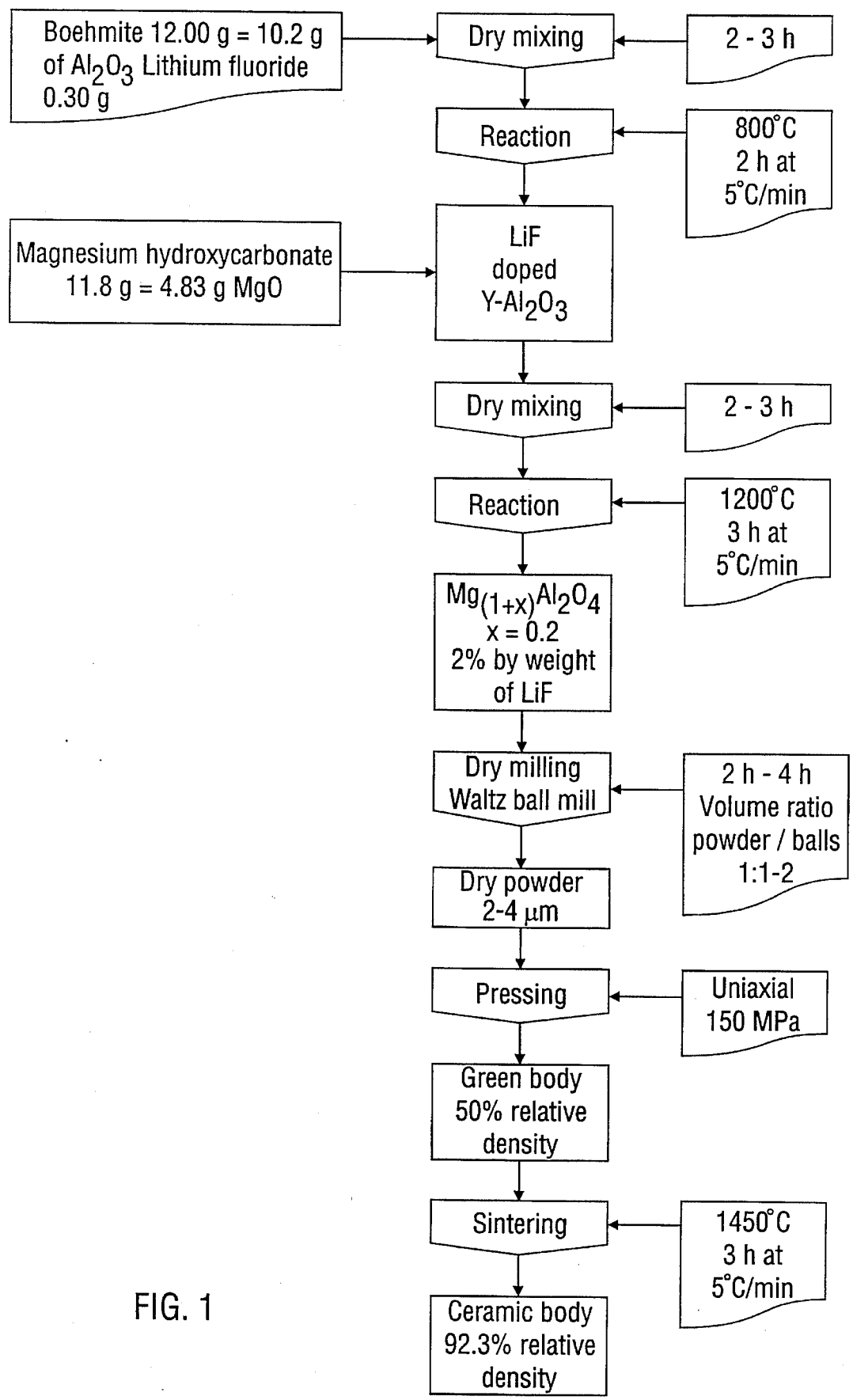
FIG. 1 is a flow diagram for synthesis of an $Mg_{(1+x)}Al_2O_4$ spinel where x=0.2, with the addition of LiF as the additive and with subsequent sintering at 1450° C.

FIG. 1 shows, as Example 1, a flow diagram for a synthesis of a $Mg_{1.2}Al_2O_4$. To prepare the precursor mixture, an aluminum oxyhydroxide (AlOOH or Al(OH)$_3$) having a regular oxygen sub-lattice without stacking faults, in particular about 12.00 g of hydrothermal boehmite (i.e. about 10.2 g of aluminum oxide ($Al_2O_3$)), is first combined with about 0.3 g of lithium fluoride as an additive. These materials are intimately mixed with one another for two to three hours at about 800° C. The heating and cooling rate is about 5° C./min. In place of lithium fluoride (LiF) as the additive, one to three per cent by weight of NaF and/or AlF$_3$ and/or LiF, or one to five percent by weight of $BNaO_2$ and/or $B_4Na_2O_7$, based on the metal oxides of the later precursor mixture, can also be added in this process stage to the precursor mixture.

The suitability of the composition of the crystal structure of the calcination product of the aluminum-containing starting material for the precursor mixture can be checked by an X-ray diffraction pattern. The X-ray pattern recorded for this purpose using a copper $K_{\alpha 1}$ source should have, relative to a 211 peak of a rutile ($TiO_2$) standard sample measured under the same conditions, which is located at a two-theta angle between 52° and 56°, a peak at both a two-theta angle between 44° and 48° and at a two-theta angle between 63° and 69°, each with an intensity measured in counts per unit time (cps) such that in each case the quotient of the square of the maximum of its noise-filtered intensity and its noise-filtered integrated intensity has a ratio to the corresponding quotient of the rutile standard sample which is, for the 44° and 48° peek, greater than 0.05 and, for the 63° and 69° peak, greater than 0.05, in particular greater than respectively 0.07 and greater than 0.09.

Advantageously, the quotients formed should be averages of at least 5 tests having a standard deviation of less than 10% and the rutile standard should be the intensity standard rutile of the National Bureau of Standard of the U.S. Department of Commerce which is available from there as standard material 674 and has a d spacing (i.e., lattice spacing) of 1.6874 Å for the 211 peak in question. In an X-ray pattern recorded with a copper $K_{\alpha 1}$ source, the above ratios relate to the calcination product of the aluminum raw material, with the aluminum raw material having been previously heated at about 800° C. to form γ-aluminate. Then, 11.80 g of magnesium hydroxycarbonate, i.e. about 4.83 g of magnesium oxide (MgO), are subsequently added to this calcined material.

The precursor mixture prepared in the above-described manner is intimately mixed in the dry state in a shaking mixer, for example in a Turbula machine T2C from WAB, for 2 to 3 hours. Subsequently, the intimately mixed precursor mixture is heated in an $Al_2O_3$ crucible for about 3 hours at a temperature of about 1200° C., with the precursor mixture being heated at a heating rate from 2° C./min to 10° C./min, in particular at 5° C./min. In this process step, the conversion of the precursor mixture into the $Mg_{1.2}Al_2O_4$ spinel occurs above 1150° C. The superstoichiometry of the magnesium in the spinel is about 20% and the proportion of LiF in the spinel is about 2% by weight.

For further processing, the spinel powder is dry-milled for from 2 to 4 hours in a Waltz ball mill. The volume ratio of spinel powder to the zirconium oxide ($ZrO_2$) balls in the ball mill being about 1:1–2. The spinel powder, now having a particle size between 2 μm and 4 μm, is pressed at a pressure of about 150 MPa to give a green body having a relative density of about 50% and is subsequently sintered for 3 hours at about 1450° C. The ceramic body so made, having a relative density of about 92.3% and comprising superstoichiometric $Mg_{1.2}Al_2O_4$, is particularly suitable for molding crucibles for producing a solid electrolyte for an electrochemical accumulator since, as a result of the magnesium contained in a superstoichiometric amount, the spinel of the molding crucible is resistant to the hot sodium oxide vapors forming during production of the dry electrolyte.

Figure 2:
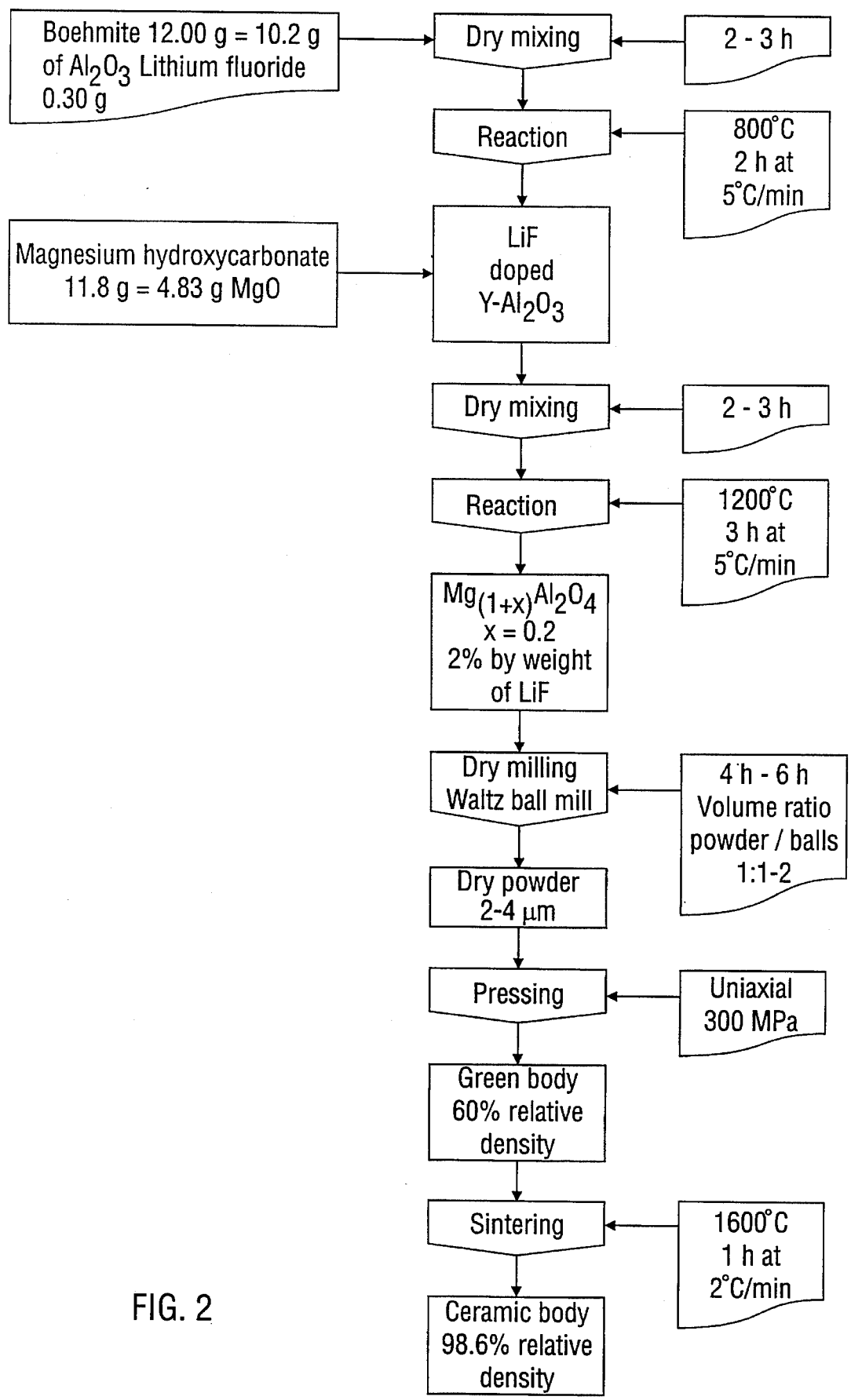
FIG. 2 is another flow diagram for synthesis of a $Mg_{(1+x)}Al_2O_4$ spinel where x=0.2, with the addition of LiF as the additive and with subsequent sintering at 1600° C.

FIG. 2 shows, as Example 2, a further process for synthesis and subsequent sintering of a $Mg_{1.2}Al_2O_4$ spinel which is also about 20% superstoichiometric in magnesium. To avoid unnecessary repetitions, only the differences between Example 1 and Example 2 will be discussed here. The process steps from weighing out the starting materials and preparing the precursor mixture to the synthesis of the spinel remain unchanged from Example 1 to Example 2. However, the spinel powder is dry-milled for up to 6 hours and is pressed at a pressure of 300 MPa to give a green body having a relative density of about 60%. The green body is then sintered for one hour at 1600° C., and the heating and cooling rates are 2° C./min. The ceramic body formed by sintering subsequently has a relative density of about 98.6% in this example.

Figure 3:
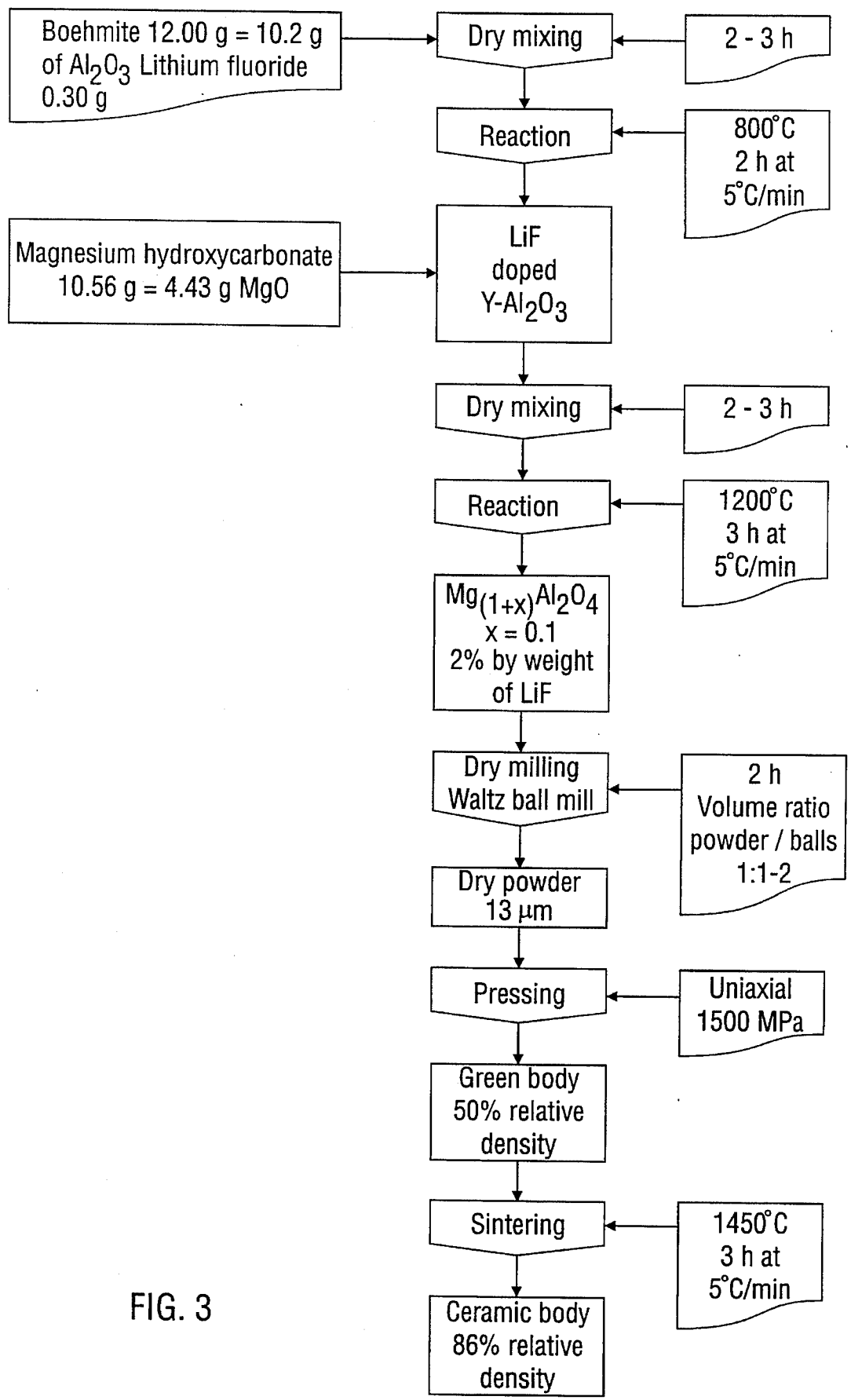
FIG. 3 shows yet another flow diagram for synthesis of a $Mg_{(1+x)}Al_2O_4$ spinel where x=0.1, with the addition of LiF as the additive and with subsequent sintering at 1450° C.

FIG. 3 shows, as Example 3, another flow diagram for a synthesis of a $Mg_{1.1}Al_2O_4$ spinel which superstoichiometric in magnesium, with the excess of magnesium in the finished spinel being about 10%. To prepare the precursor mixture, about 12.00 g of hydrothermal boehmite, 10.56 g of magnesium hydroxycarbonate and about 0.30 g of lithium fluoride are used. Thus, the weight calculated for $Al_2O_3$ is 10.2 g and the weight calculated for MgO is 4.43 g. Also in this precursor mixture, the MgO is used in a superstoichiometric amount, based on the proportion of Mg in a later stoichiometric $MgAl_2O_4$ spinel. The prepared precursor mixture is intimately mixed in the dry state and is subsequently heated in a $Al_2O_3$ crucible for about 3 hours at a temperature of about 1200° C. The super-stoichiometry of the magnesium in this spinel is about 10% and the proportion of LiF in the spinel is about 2% by weight. For further processing, the spinel powder is dry-milled for two hours until the spinel powder has a particle size of about 13 μm. The powder is then pressed at a pressure of about 150 MPa to give a green body having a relative density of about 50% and is subsequently sintered for 3 hours at about 1450° C. The ceramic body of superstoichiometric $Mg_{1.1}Al_2O_4$ spinel produced in this manner then has a relative density of about 92.3%.

Figure 4:
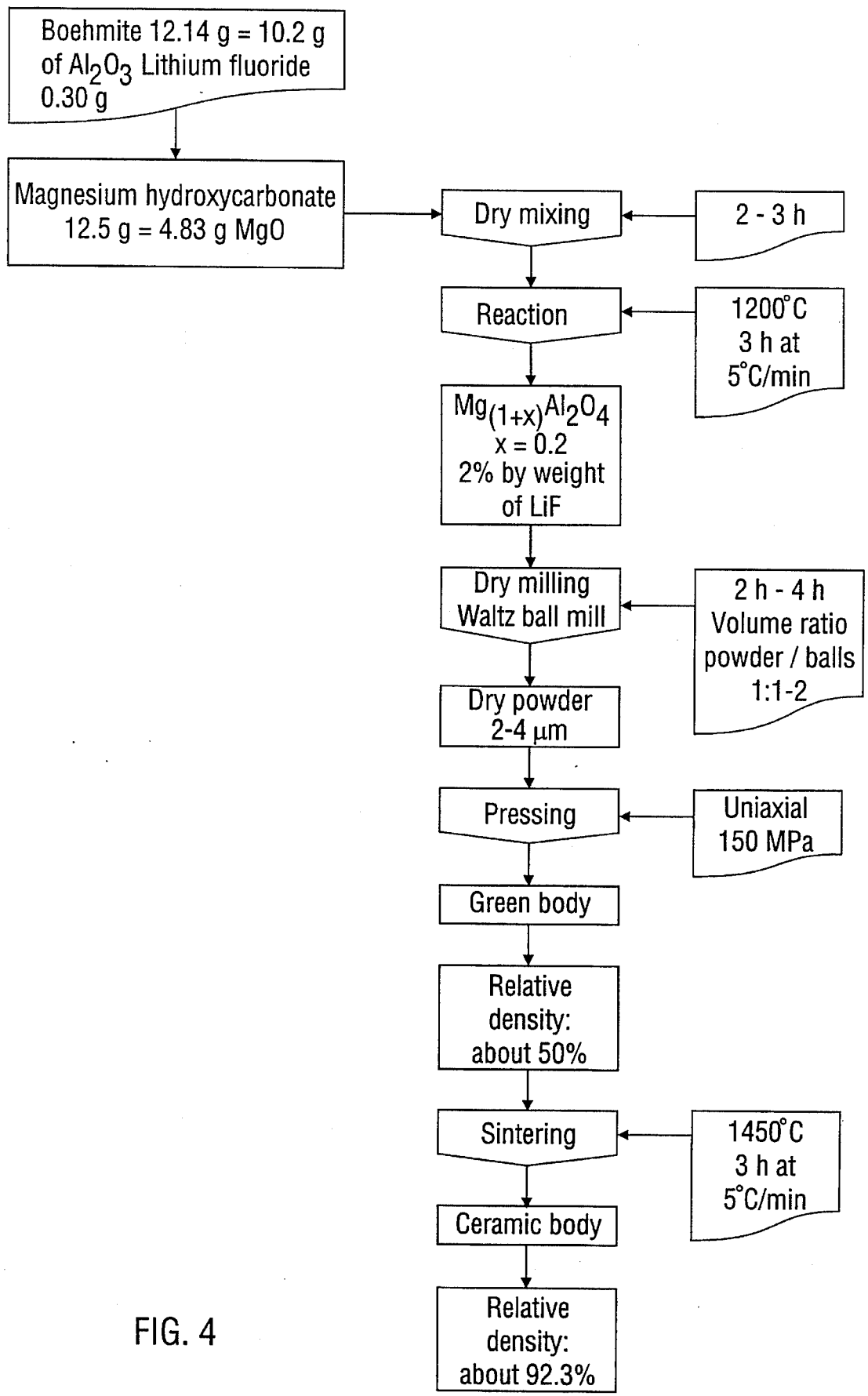
FIG. 4 is still another flow diagram for synthesis of a $Mg_{(1+x)}Al_2O_4$ spinel where x=0.2, with the addition of NaF as the additive and with subsequent sintering at 1450° C.

FIG. 4 shows, as Example 4, a flow diagram for a synthesis of an $Mg_{1.2}Al_2O_4$ spinel with the aid of sodium fluoride (NaF). To prepare the precursor mixture, an aluminum oxyhydroxide (AlOOH or $Al(OH)_3$) having a regular oxygen sub-lattice free of stacking faults, namely about 12.14 g of hydrothermal boehmite, a reactive magnesium salt, (in this example 12.54 g of magnesium hydroxycarbonate), and about 0.3 g of sodium fluoride as the additive are combined. Thus, the weight calculated for aluminum oxide ($Al_2O_3$) is 10.2 g and the weight calculated for MgO is 4.83 g, the MgO being used in a superstoichiometric amount in the precursor mixture, based on the proportion of Mg in a stoichiometric $MgAl_2O_4$ spinel. The suitability of the composition of the crystal structure of the aluminum oxide for the precursor mixture can again be checked by an X-ray diffraction pattern. The so-prepared precursor mixture is intimately mixed in the dry state in a shaking mixer, for example in a Turbula machine T2C from WAB, for 2 to 3 hours. Subsequently, the mixed precursor mixture is heated in an $Al_2O_3$ crucible for about 3 hours at a temperature of about 1200° C., and the precursor mixture is heated at a heating rate from 2° C./min to 10° C./min, in particular at 5° C./min. In this heating step, the conversion of the precursor mixture into the $Mg_{1.2}Al_2O_4$ spinel occurs above 1150° C.

After the synthesis, the particle size of the synthesized spinel particles is between 21 and 24 μm. The superstoichiometry of the magnesium in the spinel is about 20% and the proportion of NaF in the spinel is about 2% by weight.

For further processing in Example 4, the spinel powder is dry-milled from 2 to 4 hours in a Waltz ball mill, with the volume ratio of spinel powder to the zirconium oxide ($ZrO_2$) balls in the ball mill being about 1:1–2. The spinel powder, now having a particle size between 2 μm and 4 μm, is pressed at a pressure of about 150 MPa to give a green body having a relative density of about 50% and is subsequently sintered for 3 hours at about 1450° C. The ceramic body made in this manner, having a relative density of about 92.3% and comprising superstoichiometric $Mg_{1.2}Al_2O_4$, is likewise suitable for molding crucibles for producing a solid electrolyte for an electrochemical accumulator.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Spinel comprising a magnesium/aluminum compound having the chemical formula $Mg_{1+x}Al_2O_4$, with $0<x\leq0.2$ and containing boron as an additive.

2. An artefact which comprises a shaped body of the spinel of claim 1.

3. An artefact according to claim 2, wherein the shaped body is in the form of a crucible which is stable at a temperature in excess of 1000° C.

4. An artefact according to claim 3, wherein the crucible has a shape which renders it suitable for use in the production of a solid electrolyte for an electrochemical storage cell.

* * * * *

UNITED STATES PATENT AND TRADEMARK OFFICE
CERTIFICATE OF CORRECTION

PATENT NO. : 5,492,871
DATED : February 20, 1996
INVENTOR(S) : Arnold van Zyl and Ping Wang It is certified that error appears in the above-indentified patent and that said Letters Patent is hereby corrected as shown below:

In claim 1, column 6, line 25, delete "Mg 1+x)" and replace -- Mg (1+x) -- therefor.

Signed and Sealed this

Twenty-fifth Day of June, 1996

Attest:

BRUCE LEHMAN

Attesting Officer          Commissioner of Patents and Trademarks